(12) United States Patent
Peterson et al.

(10) Patent No.: US 8,006,448 B2
(45) Date of Patent: Aug. 30, 2011

(54) PREFABRICATED, PREFINISHED REINFORCED PANELS FOR BUILDING EXTERIOR AND INTERIOR SURFACES AND METHOD OF MANUFACTURE

(76) Inventors: Richard E. Peterson, Afton, MN (US); Michael R. Sullivan, St. Paul, MN (US)

( * ) Notice: Subject to any disclaimer, the term of this patent is extended or adjusted under 35 U.S.C. 154(b) by 2150 days.

(21) Appl. No.: 10/423,155

(22) Filed: Apr. 24, 2003

(65) Prior Publication Data

US 2003/0200711 A1    Oct. 30, 2003

Related U.S. Application Data

(60) Provisional application No. 60/376,534, filed on Apr. 25, 2002.

(51) Int. Cl.
E04B 1/00 (2006.01)
(52) U.S. Cl. ........................ 52/268; 52/309.11
(58) Field of Classification Search ................. 52/405.1, 52/309.11, 405.3, 268, 407.4, 426
See application file for complete search history.

(56) References Cited

U.S. PATENT DOCUMENTS

| | | | | |
|---|---|---|---|---|
| 2,645,929 A * | 7/1953 | Jones | | 52/405.3 |
| 3,803,784 A * | 4/1974 | Becker | | 52/405.3 |
| 3,885,008 A | 5/1975 | Martin | | |
| 4,067,165 A * | 1/1978 | Timmons | | 52/585.1 |
| 4,249,354 A | 2/1981 | Wynn | | 52/438 |
| 4,440,376 A | 4/1984 | Peterson | | 249/18 |
| 4,545,163 A * | 10/1985 | Asselin | | 52/378 |
| 4,619,032 A | 10/1986 | Sudrabin | | |
| 5,119,606 A * | 6/1992 | Graham | | 52/125.4 |
| 5,242,249 A * | 9/1993 | Grayson | | 405/286 |
| 5,617,700 A | 4/1997 | Wright et al. | | 52/793.1 |
| 5,624,615 A | 4/1997 | Sandorff | | 264/71 |
| 5,642,594 A | 7/1997 | Sucre | | 52/270 |
| 5,667,192 A | 9/1997 | Van Doren | | 249/82 |
| 5,864,999 A | 2/1999 | Wallin | | 52/293.1 |
| 5,867,964 A | 2/1999 | Perrin | | 52/745.1 |
| 5,884,442 A | 3/1999 | Breault | | 52/245 |
| 5,887,404 A | 3/1999 | Kreizinger | | 52/592.1 |
| 5,906,075 A | 5/1999 | Sowers | | 52/79.8 |
| 6,000,194 A | 12/1999 | Nakamura | | 52/783.17 |
| 6,009,677 A | 1/2000 | Anderson | | 52/251 |
| 6,026,629 A | 2/2000 | Strickland et al. | | 52/794.1 |
| 6,112,489 A * | 9/2000 | Zweig | | 52/405.1 |
| 6,119,422 A | 9/2000 | Clear et al. | | 52/309.8 |
| 6,134,855 A | 10/2000 | Beck | | 52/520 |
| 6,158,182 A | 12/2000 | Biebuyck | | 52/235 |
| 6,202,375 B1 * | 3/2001 | Kleinschmidt | | 52/309.11 |
| 6,230,409 B1 * | 5/2001 | Billings et al. | | 29/897.32 |
| 6,260,320 B1 | 7/2001 | Di Lorenzo | | 52/414 |
| 6,282,853 B1 * | 9/2001 | Blaney et al. | | 52/223.7 |
| 6,370,835 B1 * | 4/2002 | Morgan et al. | | 52/745.05 |
| 6,945,506 B2 * | 9/2005 | Long, Sr. | | 249/213 |

FOREIGN PATENT DOCUMENTS

| EP | 1 175 986 | 1/2002 |
|---|---|---|
| FR | 2 298 658 | 8/1976 |
| GB | 491397 | 9/1938 |

* cited by examiner

*Primary Examiner* — Basil Katcheves
(74) *Attorney, Agent, or Firm* — Kagan Binder, PLLC

(57) ABSTRACT

A building panel for attachment to exterior and interior building surfaces, the panel including a casting layer having at least one imbedded reinforcing layer, at least one attachment means extending through the casting layer and imbedded reinforcing layer for attachment to a building frame, and a finishing layer adjacent to the casting layer, the finishing layer being positioned to cover a first end of the at least one attachment means.

13 Claims, 6 Drawing Sheets

PREFABRICATED, PREFINISHED REINFORCED PANELS FOR BUILDING EXTERIOR AND INTERIOR SURFACES AND METHOD OF MANUFACTURE

CROSS-REFERENCE TO RELATED APPLICATION

The present non-provisional Application claims the benefit of commonly assigned provisional Application having Ser. No. 60/376,534, filed on Apr. 25, 2002, and entitled PREFABRICATED, REFINISHED STEEL REINFORCED CEMENT PANEL FOR BUILDING EXTERIOR AND INTERIOR SURFACES AND METHODS OF MANUFACTURE, which Application is incorporated herein by reference in its entirety.

TECHNICAL FIELD

The present invention relates to prefabricated building panels for use as exterior and interior building surfaces and specifically relates to reinforced building panels and methods of manufacturing such panels.

BACKGROUND OF THE INVENTION

For some time, the building industry has used prefabricated building panels of various compositions and methods of manufacture for the exterior and interior surfaces of buildings. One example of such panels includes those used in "curtain wall" construction of large, multi-story buildings. Typically, these types of panels are made of steel rebar reinforced concrete and are approximately 4 to 6 inches (10.16 cm to 15.24 cm) thick. This panel construction often results in panels that are quite heavy. Various methods for attachment of these panels to the steel superstructure of buildings have been developed, including welded tabs, clips, and similar devices, all of which must be capable of securely attaching these heavy panels without danger of attachment failure. Other considerations are also involved when using building panels on the exterior surfaces of buildings. For example, stucco exteriors are very popular but have many inherent problems including cracking, leaking, detachment from the building frame as well as being among the most labor intensive and therefore most expensive of building exterior surfaces.

Lighter weight panels have been developed for use in residential and light industrial buildings, such as "pebble board", which consists of a plywood-type backing with an aggregate material adhered to the surface. Other lighter weight panels that are available include those made of foam substrates and may have cement, polymer, or other similar surface finishes. While these panels are often more lightweight than panels made of concrete and other heavy materials, they are also typically less strong and less resistant to the environment than the panels used for exterior applications. For example, these products can suffer from rotting, water damage and other forms of deterioration, as well as undesirable flexibility under wind loading conditions. To date, a lightweight, rigid, impact-resistant reinforced building panel with a vast array of available textures and colors and an efficient attachment system for said panel has been unavailable to the building trades. As an example of a specific need in the industry, it is desirable to provide a stucco exterior for a building without any of the inherent problems associated with conventional stucco finishes.

SUMMARY OF THE INVENTION

In one aspect of this invention, a building panel is provided for attachment to exterior and interior building surfaces, the panel including a casting layer having at least one imbedded reinforcing layer, at least one attachment means extending through the casting layer and imbedded reinforcing layer for attachment to a building frame, and a finishing layer adjacent to the casting layer, the finishing layer being positioned to cover a first end of the at least one attachment means. The primary reinforcing layer may be a mesh material, and the mesh material may be steel. The attachment means of the building panel may include a first washer on a first side of one of the reinforcing layers, a second washer on a second side of one of the reinforcing layers, and a securing member extending through a first reinforcing layer and secured to the first and second washers. The building panel may also include a second reinforcing layer, with the securing member extending through the first and second reinforcing layers, and the securing member may be a steel sleeve. The attachment means may specifically include an opening that is sized to accept a corresponding fastener for securing the building panel to a building structure. The casting layer may be a cement-based material including an additive and may have a textured, pigmented, and/or patterned outer surface. The finish layer of the building panel may have a textured, pigmented, and/or patterned outer surface.

In another aspect of the invention a resusable mold system is provided for the manufacturing of building panels generally of the type described above, the mold system including a frame and at least one mold module positioned within the frame, wherein the mold module is configured to receive a reinforcing layer and a casting material for the casting layer. The mold system may further include a plurality of mold modules positioned within the frame in a stacking configuration, and the frame may on a supporting, movable member, where that member may be a pallet. At least one of the mold modules may have at least one separator for subdividing the mold module into at least two sections. In addition, at least one of the mold modules may comprise at least one insert for embossing a pattern into at least one of the sides of the building panel. The frame may further include at least one vibrating mechanism for vibrating the frame to reduce air bubble and voids in the casting layer of the building panel.

BRIEF DESCRIPTION OF THE DRAWINGS

The present invention will be further explained with reference to the appended Figures, wherein like structure is referred to by like numerals throughout the several views, and wherein:

FIG. 4 is a perspective view of one embodiment of a mold frame of the type used in building panel manufacturing operations such as the illustrated operation of FIG. 3a;

DETAILED DESCRIPTION OF THE PREFERRED EMBODIMENTS

Among the other advantages of the present invention, the building panels of the present invention feature the utility and diverse finishes of "curtain wall" panels for large, multi-story buildings as well as the lightweight and easy attachment characteristics desired for residential and light industrial construction. The panels of the present invention are preferably rigid and impact-resistant, reinforced building panels for use on building interior and exterior surfaces. The present invention also provides various means of manufacturing these panels.

Figure 1A:
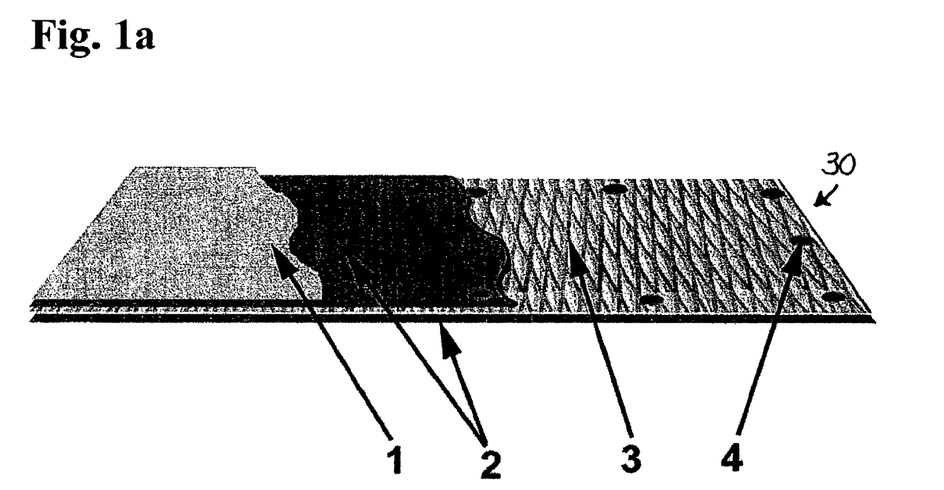
FIG. 1a is a cutaway perspective view of one embodiment of a building panel construction in accordance with the present invention, showing the multiple layers partially separated from each other.

Referring now to the Figures, wherein the components are labeled with like numerals throughout the several Figures, and initially to FIG. 1a, one preferred configuration is illustrated in a cutaway view of a building panel 30 for use in creating exterior shells and/or interior surfaces for a building, showing multiple layers in the panel structure. As shown, the panel 30 generally includes an expanded primary reinforcing layer 3, a casting material layer 2 that can be seen both above and below the layer 3, a finish layer 1, and a plurality of hard point assemblies 4 for attachment of the panel 30 to a building frame or the like.

In one preferred embodiment, the primary reinforcing layer 3 is a sheet of expanded metal, such as steel. One exemplary material from which the layer 3 can be made is an 18 gauge expanded sheet steel having diamond-shaped grids that are approximately $1.5/16$" swd (short diamond width) by $3/16$" lwd (long diamond width). However, it is understood that the material chosen for the layer 3 may be chosen from a wide variety of materials that provide the desired amount of strength for a finished panel. For example, one or more sheets of the same or a different gauge steel, stainless steel, aluminum, or the like having the same or different diamond patterns may also be used, depending on the structural properties desired for the panel. It is further understood that the patterns of the layer 3 may be different than a diamond pattern, and may use different types of mesh material, such as welded or woven materials (e.g., chicken wire or cribbing wire). Any of these materials that are used for the layer 3 may be provided with or without additional coatings, such as galvanized coatings, anodized coatings, various polymer coatings (e.g., polyurethane), or any other corrosion resistant coatings, such as anti-corrosion paint.

The casting material layer 2 of the panel 30 can include a wide variety of materials and is typically poured or otherwise provided so that the reinforcing layer 3 will be embedded therein. In one preferred embodiment, the casting layer 2 is a cement-based material such as, for example, a high early strength white Portland cement mixed in an approximate ratio of 1 part cement and 2 to 3 parts silica sand to achieve desired properties of the layer 2. Alternative casting materials include, but are not limited to, plaster or polymers such as polyester resin or polyurethane foam. The layer 2 may have a textured, pigmented, and/or patterned outer surface, as desired. The material that comprises the casting layer 2 may also include various additives including, but not limited to, air entrainment, curing accelerator, cellular foam, polymer fibers or pigments, which are added in appropriate amounts to achieve certain material properties. Polymer fibers can be added to other types of materials as secondary reinforcement to control hairline cracking that can occur due to freeze/thaw cycles and handling.

The finish layer 1 of the panel 30 illustrated in FIG. 1 may include a wide variety of materials to provide desired qualities for the outer layer, such as cement, plaster or polymer finishes in various colors, textures, pigments, and patterns. When the panels are used on the exteriors of buildings, the finish layer 1, which will be exposed to the outdoor environment, must be made of a material that can withstand the weather and other conditions to which it will be subjected. In these outdoor applications, the finish layer 1 may be cement or polymer based, for example. Exemplary cement based finishes can include single coat stucco or sand with various textures, embossed patterned surfaces and pigments. Exemplary polymer based finishes can use products with various textures, embossed patterned surfaces and pigments as well as various waterproofing materials for below-grade applications. Specific material examples include a variety of exterior surface finish materials commercially available from companies such as Senergy, LLC, of Jacksonville, Fla. or Dryvit Systems, Inc., of West Warwick, R.I.

When the panels of the present invention are to be used on the interior surfaces of buildings, the material or materials that comprise the finish layer 1 do not typically need to be as resistant to harsh environmental conditions. Thus, the finish layer 1 for interior panels can include materials such as cement, polymer or plaster-based materials. Finishes for building interior panels can include various textures, embossed patterned surfaces and pigments. Depending on the particular use of panels for interior or exterior surfaces, the finish layer 1 may be primarily used to achieve a certain appearance for the outer surface of the panel 30, but the layer 1 may also be designed to provide a certain amount of structural integrity for the panel 30, as desired.

The building panels of the present invention may be a wide variety of sizes and shapes, depending on where the panels will be used. In the embodiment of FIG. 1a, for example, the casting layer 2 may have a thickness that varies from approximately 0.375 inch (0.95 cm) to approximately 0.75 inch (1.91 cm), although the thickness can be considerably smaller or larger than this range, as desired. The outer dimensions of the building panels may also include a wide range of sizes, where exemplary panels may have widths up to 6 feet (1.83 m) and lengths up to approximately 12 feet (3.66 m), however, the actual width and length can be considerably smaller or larger than these exemplary dimensions. The panel size preferably is chosen to optimize the strength to weight ratio of the panel and also to provide panels that are reasonably easy to maneuver during shipping, handling, and installation thereof. The panels may also be designed to provide accessory components of similar material and manufacture but of varying shapes and sizes, including corner modules, gable end modules and decorative trim modules. Textures and patterns can be applied to the outer surfaces of the panels in the mold, as will be described in further detail below.

Figure 1B:
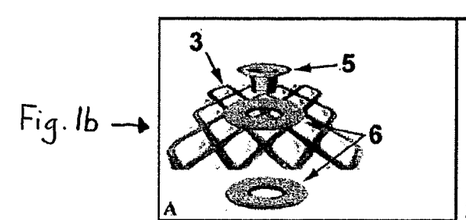
FIG. 1b is an exploded perspective view of one embodiment of a hard point assembly of the type that could be used in the embodiment of FIG. 1a, using a single sheet of expanded reinforcing material.
Figure 1C:
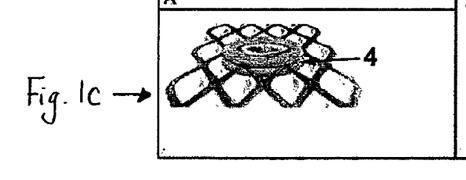
FIG. 1c is a perspective view of the hard point assembly of FIG. 1b, with the end of the eyelet rolled over as in a final construction.
Figure 1D:
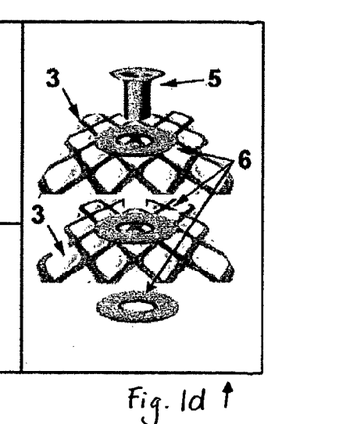
FIG. 1d is an exploded perspective view of another embodiment of a hard point assembly of the type that could be used in the embodiment of FIG. 1a, using a multiple sheets of expanded reinforcing material.

Referring again to FIG. 1a, the reinforcing layer 3 preferably includes a plurality of hard point assemblies 4 for affixing the panel 30 to a building frame using screws, bolts, nails, rivets or similar fasteners. More specifically, FIGS. 1b-1d illustrate one preferred embodiment of a hard point assembly or attachment means 4 of the present invention. In particular, FIG. 1b shows an exploded view of a single reinforcing layer 3, an eyelet 5, and a washer 6, and FIG. 1c shows the hard point assembly 4 in its completed or assembled form, with the end of the eyelet 5 bent or rolled over to secure it to the washer 6. FIG. 1d illustrates an embodiment similar that of FIG. 1b, however, this embodiment includes two reinforcing layers 3, and an additional washer 6 positioned between the two layers 3. It is understood that additional reinforcing layers 3 may be provided in a particular construction, and any panel construction may include any number of washers 6 (or no washers) on either side or both sides of each reinforcing layer 3, depending on the particular application. In any case, the hard point assemblies 4 are preferably assembled through a hole or opening that is drilled or punched through the reinforcing layer or layers 3 in the desired locations. It is understood that this embodiment of the hard point assemblies 4 is only one of many similar configurations that are contemplated by the present invention, where the eyelet 5 may have a different configuration, such as a differently shaped member with a hole extending through its body, and the washers 6 may have a different configuration than that of a relatively flat, circular member with a center hole. For example, if the hard point assembly includes a member having a oval shaped opening through its body, the washers may include a corresponding oval shaped opening that is either in the center or offset from the center. Many other shapes and configurations are also possible, where the various members are preferably easy to align relative to one another in the hard point assembly 4.

The components of hard point assemblies 4 are preferably made of a material that provides sufficient strength for attaching a particular panel 30 to a building frame, such as steel, for example. It is also preferable that any layers 3 and the components of the hard point assemblies 4 that may contact those layers 3 in a particular building panel are made from materials that do not corrode when in contact with each other. If the layer or layers 3 are made from a metal, for example, it is preferable that any portions of assemblies 4 that contact a layer 3 are made of a metal that does not cause either or both of the materials to corrode. It is further contemplated that portions of either assemblies 4, layers 3, or both assemblies 4 and layers 3 may also be coated with a corrosion-resistant coating as a further preventative measure to guard against corrosion within the building panels.

A panel may include any desired number and spacing of hard point assemblies 4, where each panel is preferably designed to include the optimum number of assemblies 4 for secure attachment of the panel to a building frame. The hard point assemblies are used to distribute sheer forces and point loads at attachment points to the reinforcing layer or layers 3, as well as providing sleeves for the attachment fasteners. This prevents cracking of the casting material at the points of attachment of the panel to a building frame. The hard point assembly system also provides for precise spatial orientation of single or multiple reinforcing sheets in the manufacturing mold and control of panel thickness during the manufacturing process. These hard point assemblies also allow for precise alignment of multiple reinforcing layers, and provide a sleeve for attachment of the panel to various building frame types with various types of fasteners. With these hard point assemblies, sheer forces and point loads from panel attachment fasteners can be transferred directly into the reinforcing layers of the panel. In one preferred method of attaching a panel having multiple hard point assemblies to a building frame, self-tapping galvanized screws, nails, rivets, bolts, or any other suitable fastener can be driven through the eyelets of the hard-point assemblies. The hard point assemblies allow quick panel installation and high shear and racking force resistance for the finished building shell.

Figure 2A:
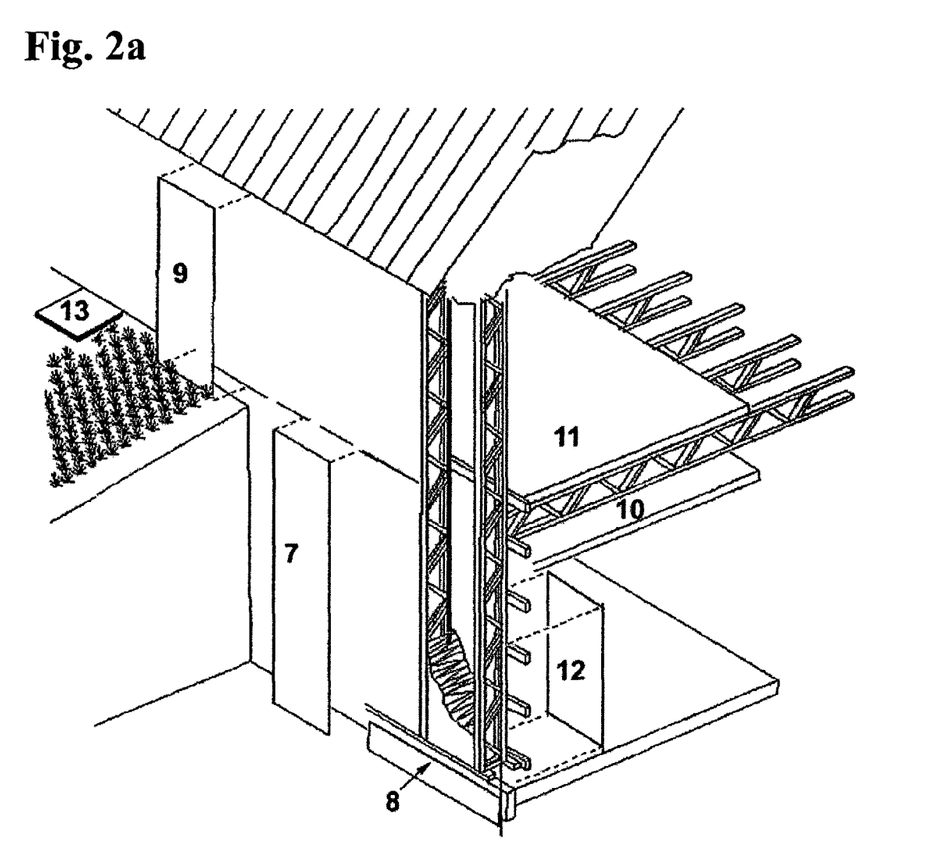
FIG. 2a is a partially broken-away perspective view of various illustrative applications for the building panels of the present invention.
Figures 2B, 2C:
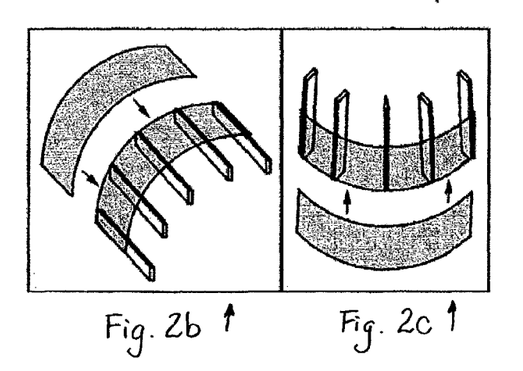
FIG. 2b is a perspective view of a vertical curvilinear application of an embodiment of the building panels of the present invention.
FIG. 2c is a perspective view of a horizontal curvilinear application of an embodiment of the building panels of the present invention.

FIG. 2a shows a partially broken-away view of multiple exemplary applications for the building panels of the present invention. The panels can include a variety of shapes, including rectilinear, curvilinear, irregular, symmetrical, non-symmetrical, and the like. The present invention contemplates panels having different thicknesses with applications for use in above-grade and below-grade exterior building surfaces and wall, floor and ceiling interior building surfaces. Additional exemplary uses illustrated in FIG. 2a include below-grade structural panels 7 for foundation walls, frost protected grade beam structural casings 8, exterior prefinished wall panels 9, interior ceiling panels 10, interior floor panels 11, interior wall panels 12, and exterior paving tiles 13. The panels of the present invention can also be used in a curvilinear vertical configuration (see FIG. 2b) or curvilinear horizontal configuration (see FIG. 2c) by attachment to a curvilinear armature before final curing.

Figure 3A:
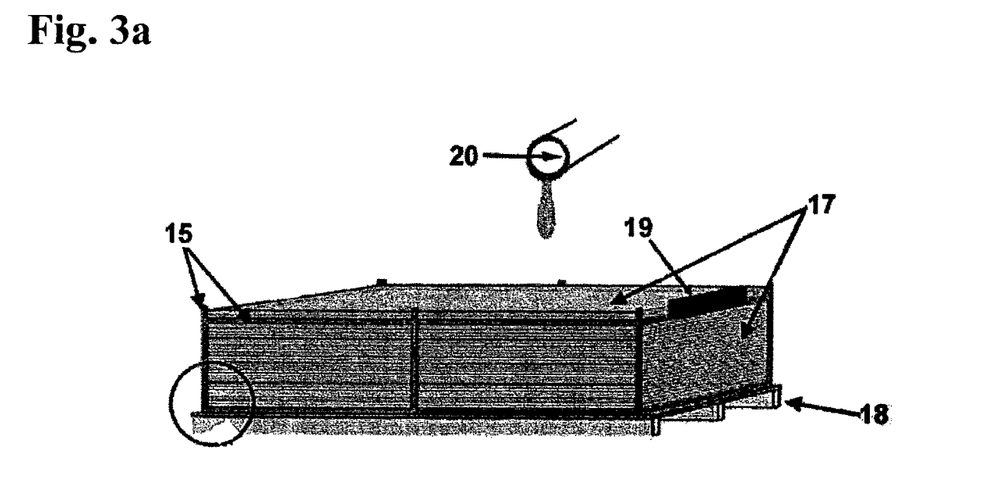
FIG. 3a is a perspective view of one configuration for the manufacturing of building panels in accordance with the present invention.

FIG. 3a is a perspective view of one configuration of a mold system used for the manufacturing of building panels in accordance with the present invention. One preferred mold system for building panel manufacturing consists generally of a mold frame that is placed on a pallet beneath the cement (or other casting material) source (mixer or pump outlet). A mold module is placed into the frame, reinforcing steel with integral hard point assemblies is inserted and casting material (typically cement but may include plaster, polymers, and other casting materials) is poured into the mold and leveled with a screed. Another mold module is placed on top of the previous module and the process is repeated until the top of the mold frame is reached (or fewer castings if desired). The pallet of poured castings can then be moved to a curing area. After a suitable curing time has elapsed, the mold frame is lifted off the stacked castings and the individual mold modules are taken from the stack and inverted onto an adjacent pallet to demold the casting. The stacked, de-molded castings can then be moved to a final curing, finishing (if necessary) and shipping area.

With particular reference to the panel mold illustrated in FIG. 3a, one embodiment of a mold frame 15 is shown, which can be made of steel, aluminum, wood or any suitable material including (but not limited to) plastics and composite materials, or any material that is sufficiently strong to support the panel manufacturing operation. The frame 15 can hold one or more stacked pan molds or modules 17, which can be made from sheet metal, plastic, wood, composites, and the like, of varying dimensions. Said modules 17 can be stacked in varying numbers inside a frame 15, and the entire unit can rest on a pallet 18 or other supporting structure. The pan mold or molds 17 can be subdivided to make castings of various sizes and shapes, where the subdivided shapes may be the same or different from each other within a single mold 17, as discussed below. The pan mold or molds 17 can utilize an insert (or more than one type of insert) for the purpose of embossing a pattern into the bottom and/or top and/or sides of the molded building panel. Inserts can be made of wood, plastic, latex, fiberglass or any other suitable material or composite. Low-relief patterns can be stamped, tooled or molded directly onto the pan mold surface. The mold frame 15 may further include at least one vibrator 19 that can be used in operations where it is desirable to eliminate voids and air bubbles in the casting material. A casting material source 20 is shown generally as a supply source for the materials that will be poured into the molds for the building panels.

Figure 3B:
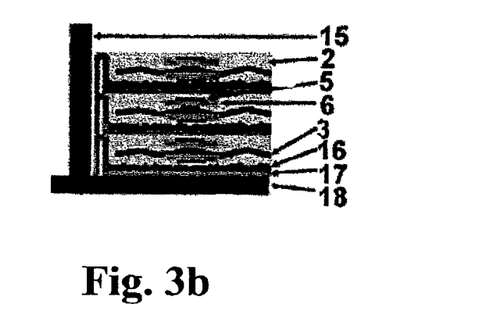
FIG. 3b is an enlarged side view of the circled portion of FIG. 3a, illustrating the various layers used in the construction of building panels of the present invention.

FIG. 3*b* is an enlarged side view of the circled portion of FIG. 3*a*, illustrating the various levels used in the construction of building panels of the present invention. The various layers include casting material or layers 2, expanded primary reinforcing layers 3, eyelets 5, washers 6, a mold frame 15, pan mold inserts or textured surfaces 16, pan molds 17, and a pallet 18.

Figure 4:
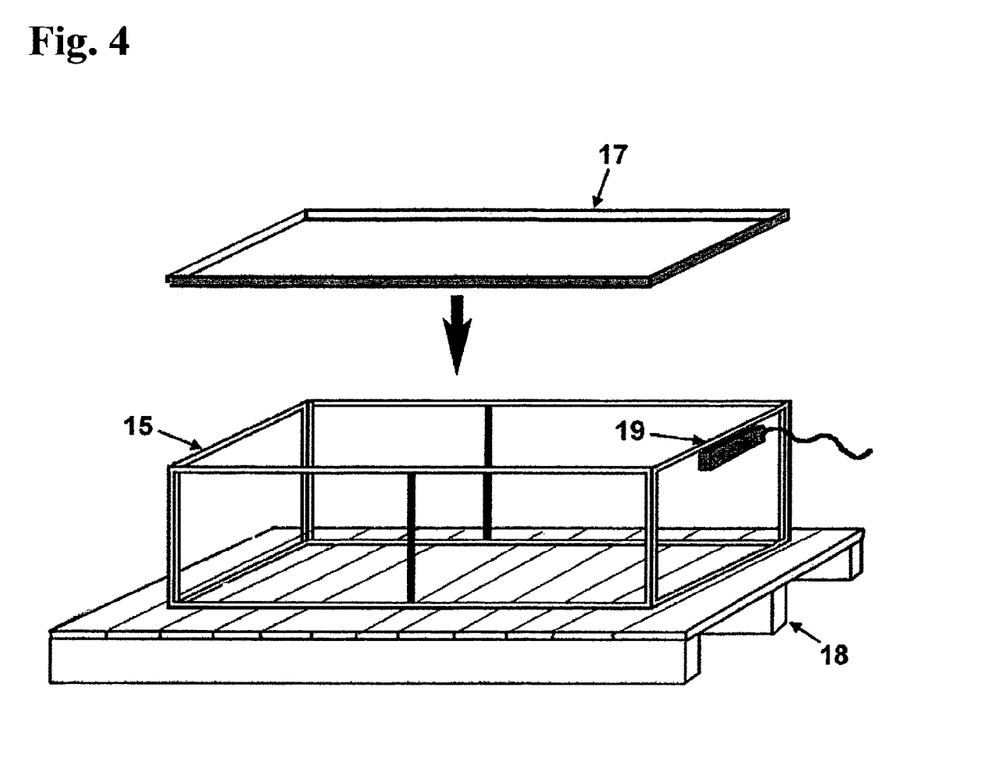

FIG. 4 is a perspective view of one embodiment of a mold frame of the type used in building panel manufacturing operations, such as the illustrated operation of FIG. 3*a*. The mold frame 15 consists of an open-bottomed box structure made of steel, aluminum, wood or any suitable material, including but not limited to plastics and composite materials. The mold frame 15 is similar in width and length to that of the pan mold modules 17, and is as high as desired for containing and constraining the horizontal movement of a convenient number of vertically stacked mold modules 17. There is preferably at least one vibrator 19 attached to the mold frame 15, which can be used to assist in complete penetration of the casting material into the reinforcing mesh inside each mold module, eliminating voids and air bubbles.

Figure 5A:
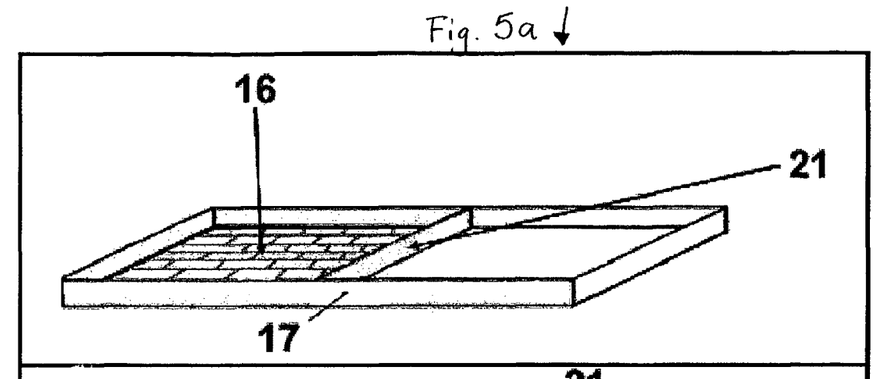
FIG. 5a is a perspective view of one configuration of a pan mold and insert assembly of the type that can be used in the manufacturing of building panels in accordance with the present invention.
Figure 5B:
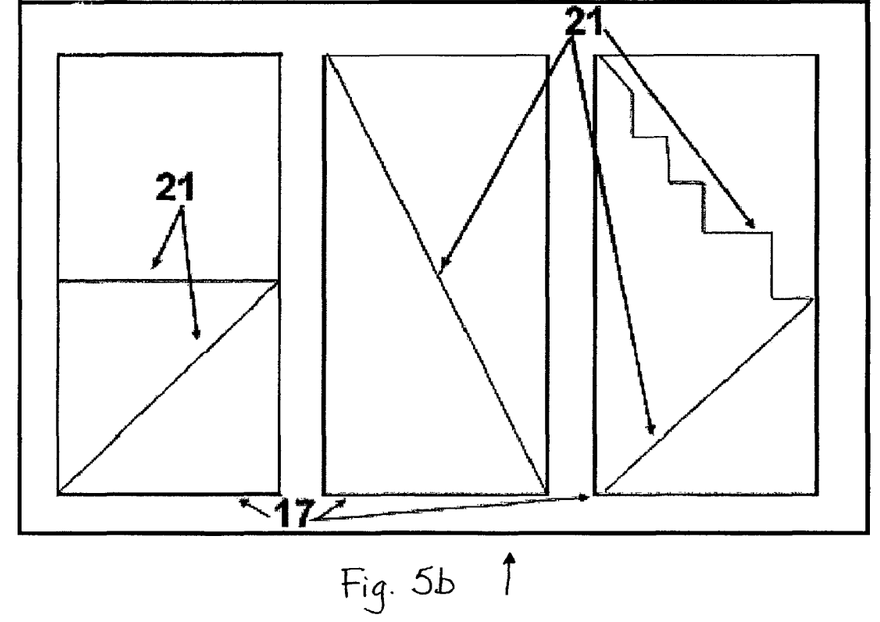
FIG. 5b is a top view of three alternative configurations of the pan mold and insert assembly of FIG. 5a used to achieve various differently shaped castings.

FIG. 5*a* is a perspective view of one configuration of a pan mold and insert assembly of the type that can be used in the manufacturing of building panels in accordance with the present invention. In particular, one preferred embodiment of a pan mold module 17 consists of a modular sheet metal, cast aluminum or steel, plastic, wood, composite, or other suitable material configured in a rectangular or other specially shaped geometric or curvilinear pan with a generally "U" shaped cross section. This pan mold 17 can be subdivided, such as with one or more pan mold separators 21, to produce various sizes and shapes of castings. The pan mold 17 can also utilize an insert, or more than one type of insert, for the purpose of embossing a pattern into the bottom and/or top and/or sides of the molded panel, such as the textured insert 16 shown in FIG. 5*a*. Low-relief patterns can be stamped, tooled, molded, or otherwise created directly onto the pan mold surface. FIG. 5*b* illustrates three alternative configurations of the pan molds 17 having pan mold separators 21 of various shapes, sizes, and geometric configurations for obtaining casting in a variety of shapes. In accordance with the present invention, any number and configuration of pan mold separators may be used, where these separators may be removable and replaceable, as desired, or may be a permanent part of the pan mold 17.

Figure 6:
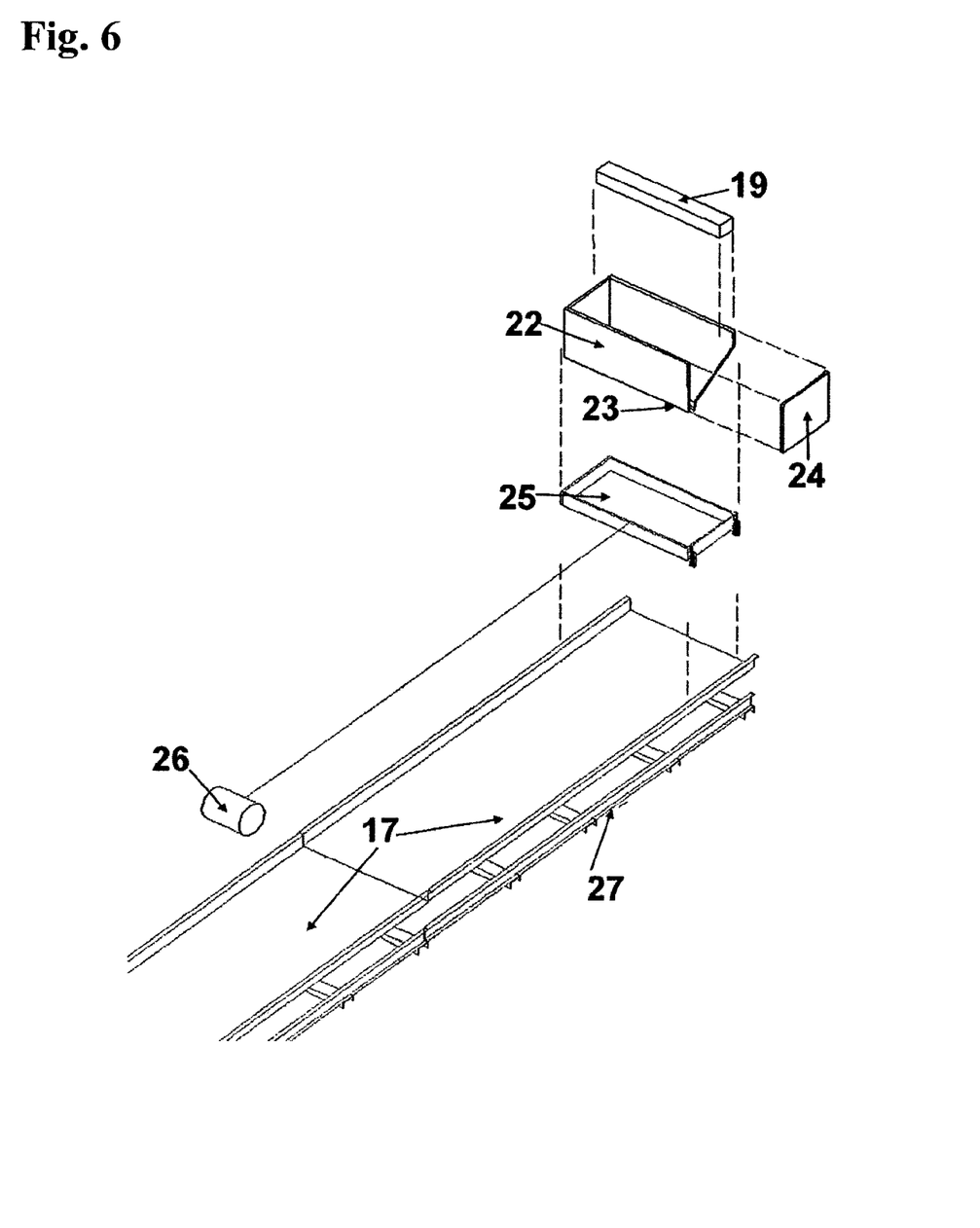
FIG. 6 is an exploded perspective view of another configuration for manufacturing building panels in accordance with the present invention.

FIG. 6 is an exploded perspective view of another embodiment of a process for manufacturing building panels in accordance with the present invention. This alternative method consists of a linear mold support table with hinges connecting it to the bases of individual pan molds 17. The pan molds 17 are preferably made of enamel coated, galvanized steel or other material with a flange that serves as an integral track at the edges, where a base with a pin and sleeve connector precisely align each individual mold module in an assembly line. The operation further includes at least one cement hopper attachment 22 having a flexible screed 23, a cement hopper sidewall 24 (detached in this figure to show the interior of the attachment 22), and an optional vibrator 19. The operation may also include a hopper cart frame 25 with wheels or other conveying mechanism on which the cement hopper attachment 22 or multiple attachments can rest. Finally, a winch apparatus 26, can carry various devices along the assembly line and serves the purpose of delivering casting material to the mold, application of a finish coating to the molded panel, and mold cleaning.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A building panel for attachment to exterior and interior building surfaces, the panel comprising:
   a casting layer having an imbedded reinforcing member that is provided within the casting layer; and
   a plurality of hard points comprising hard point attachment elements for attachment of the building panel to a building frame, each hard point attachment element extending through the casting layer and operatively attached to the imbedded reinforcing member for distributing sheer forces and point loads from the plurality of hard points to the imbedded reinforcing member.

2. The building panel of claim 1, wherein the reinforcing member is an expanded mesh material.

3. The building panel of claim 2, wherein the expanded mesh material is steel.

4. The building panel of claim 1, wherein each of the hard points comprises a first washer on a first side of the reinforcing member, a second washer on a second side of the reinforcing member, and the hard point attachment element extends through a first reinforcing member and is secured to the first and second washers.

5. The building panel of claim 4, further including a second reinforcing member, wherein the hard point attachment element of each hard point extends through the first and second reinforcing member.

6. The building panel of claim 4, wherein the hard point attachment element of each hard point is a steel sleeve.

7. The building panel of claim 1, wherein the casting layer comprises a cement-based material including an additive.

8. The building panel of claim 1, wherein the hard point attachment element of each hard point includes an opening that is sized to accept a corresponding fastener for securing the building panel to a building structure.

9. The building panel of claim 1, further comprising a finishing layer provided adjacent to the casting layer.

10. The building panel of claim 9, wherein the finish layer comprises a separate layer from the casting layer, and the finish layer has a textured outer surface.

11. The building panel of claim 9, wherein the finish layer comprises a separate layer from the casting layer, and the finish layer has a patterned outer surface.

12. The building panel of claim 9, wherein the finish layer comprises a portion of the casting layer that is provided with a finished outer surface.

13. The building panel of claim 9, wherein the finishing layer is positioned to cover a first end of the hard point attachment elements.

* * * * *